United States Patent [19]

Coleman

[11] 3,917,894

[45] *Nov. 4, 1975

[54] PROCESS FOR COATING REGENERATED CELLULOSE FILM AND THE COATED FILM

[75] Inventor: Harold R. Coleman, Danville, Ill.

[73] Assignee: Tee-Pak, Inc., Chicago, Ill.

[ * ] Notice: The portion of the term of this patent subsequent to Oct. 9, 1990, has been disclaimed.

[22] Filed: Aug. 17, 1973

[21] Appl. No.: 389,307

Related U.S. Application Data

[63] Continuation-in-part of Ser. No. 66,645, Aug. 24, 1970, Pat. No. 3,764,350, which is a continuation-in-part of Ser. Nos. 697,592, Jan. 15, 1968, Pat. No. 3,539,361, and Ser. No. 44,556, June 8, 1970, Pat. No. 3,695,904.

[52] U.S. Cl. ................ 428/414; 427/381; 427/386; 427/407; 428/532
[51] Int. Cl.² .................. B32B 23/08; A22C 13/00
[58] Field of Search ............... 117/76 F, 94, 145, 45

[56] References Cited

UNITED STATES PATENTS

| | | | |
|---|---|---|---|
| 2,573,956 | 11/1951 | Daniel et al. | 117/145 X |
| 2,763,571 | 9/1956 | Wooding et al. | 117/145 X |
| 2,980,554 | 4/1961 | Gentile et al. | 117/145 X |
| 3,378,379 | 4/1968 | Shiner et al. | 117/95 X |
| 3,764,350 | 10/1973 | Coleman | 117/145 |

*Primary Examiner*—Ralph Husack
*Attorney, Agent, or Firm*—Neal J. Mosely; Russell L. Brewer

[57] ABSTRACT

A coated regenerated cellulose film or sheet is primed in the gel state with an epoxy substituted resin consisting of a water-soluble, thermosetting reaction product of an epihalohydrin and a polysecondary amine, and then coated with a mixture of a resin and a liquid vehicle optionally including a dryer, plasticizer, or pigment. The cellulose film or sheet can be of the unreinforced and fiber-reinforced type.

6 Claims, No Drawings

3,917,894

PROCESS FOR COATING REGENERATED CELLULOSE FILM AND THE COATED FILM

RELATED APPLICATIONS

This application is a continuation-in-part of copending application having Ser. No. 66,645 filed Aug. 24, 1970 now U.S. Pat. No. 3,764,350which is a continuation-in-part of copending application Ser. No. 697,592, filed Jan. 15, 1968, now U.S. Pat. No. 3,539,361 and copending application Ser. No. 44,556, filed June 8, 1970, now U.S. Pat. No. 3,695,904. The relevant subject matter of the above related applications are hereby incorporated by reference.

BACKGROUND OF THE INVENTION

This invention relates to a new and improved process for making regenerated cellulose films including sheet film and tubular film, e.g., sausage casings and to the resulting product. More particularly, it relates to a process in which the regenerated cellulose film is provided with a primer coating and then a resin coating which imparts desirable properties, e.g., oxygen and water vapor impermeability to the film, color, and printing.

Regenerated cellulose films including sheet films and artificial sausage casings (tubular films), for example, are normally manufactured by the viscose process. In the manufacture of cellulosic sausage casings, viscose is extruded through an annular die into a coagulating and regenerating bath to provide a hollow, thin-walled tube of coagulated and partially regenerated cellulose xanthate. The extruded tube is subsequently treated in an acid bath to thoroughly regenerate the cellulose, and is subsequently washed to remove by-products. The regenerated cellulose tube is eventually treated with an aqueous solution of glycerin and then dried and wound on reels. A type of casing known in the art as fibrous casing is manufactured by forming a long fiber hemp paper into a continuous tube, impregnating the tube with viscose, and treating the impregnated tube with a coagulating and regenerating bath to produce a paper-reinforced tube of regenerated cellulose.

STATEMENT OF OBJECTS AND FEATURES

Accordingly, it is one object of this invention to provide an improved process for making regenerated cellulose films having improved properties, e.g., moisture and oxygen impermeability and enhanced adhesion of such coating thereon.

Another object of this invention is to provide an improved process for making regenerated cellulose casings including those of the fibrous type having enhanced adhesion of coatings thereon.

Another object of the invention is an improved coated regenerated cellulose film.

SUMMARY OF THE INVENTION

In this invention, cellulose film or casing is coated while in the gel state. While the film or casing is in the gel state and prior to the drying thereof, an aqueous solution of an epoxy substituted resin consisting of a water-soluble thermosetting reaction product of an epihalohydrin and a polysecondary amine selected from the group consisting of polyamideamines and polyureaamines having an epoxy equivalent of at least about 100 is applied over the surface and dried to provide a primer coating. Then, a coating composition comprising a resin in a liquid vehicle is applied over the coated film or casing and dried to provide an imprint of resin over the coated film.

DESCRIPTION OF THE PREFERRED EMBODIMENTS

In carrying out this invention, a gel film of regenerated cellulose is produced by conventional methods, e.g., extrusion, coagulation, washing, and plasticizing. While the film is in the gel state and prior to the drying thereof, it is provided with a primer coating of aa thermosetting, epoxy-substituted polysecondary amine resin. The coated sheet or film is dried to cure the coating and then coated with a composition comprising a resin and in a solvent system; optionally, pigments or dyes, driers, crosslinking agents and the like.

The epoxy-substituted polysecondary amine resins employed to provide primer coatings in accordance with the present invention are water-soluble, thermosetting, nonfilm-forming resinous reaction products of an epihalohydrin, e.g., epichlorohydrin, with polymers containing a plurality of —NH— groups and having an epoxide equivalent weight of at least about 100 and preferably less than about 2000 (as determined by reaction with mercaptoethanol in the procedure described in Bates TAPPI, 52, No. 6, 169, Page 1163). Examples of such resinous materials include water-soluble, thermosetting, epihalohydrin-modified polyamines, selected from the group consisting of polyamideamines, such as condensation products of polyalkylene polyamines, e.g., diethylene triamine and triethylene tetraamine, and aliphatic dicarboxylic acids, e.g., succinic acid and adipic; and polyureaamines, such as condensation products of the described polyalkylene polyamines and aliphatic diisocyanates, e.g., 4,4'-methylene bis (cyclohexyl isocyanate). The resinous primary materials must be water-soluble or at least dispersible in water. In general, the epoxy-substituted primer employed has a water-solubility of at least 5% at 25°C. The epoxy-substituted primer materials employed in the present invention are further characterized by their ability to form aqueous solutions having relatively low viscosities at concentrations suitable for application. Usually, the viscosity of a 1% aqueous solution of a suitable resin should not exceed about 100 centipoises at 25°C.

The epoxy-substituted primer material preferred for use in the present method, by virtue of its stability, low viscosity, and curability at neutral pHs to non-film primer coatings is Kymene 557 (also called Hercules Resin 2000), a water-soluble, thermosetting epoxy-substituted polymer marketed by Hercules, Inc., which is the reaction product of epichlorohydrin and an adipic acid-diethylene triamine polyamide having an epoxide equivalent content of about 450–500 (as determined by reaction with mercaptoethanol in the procedure described in Bates, TAPPI, 52, No. 6, 1969, , Page 1163), a Kjeldahl nitrogen content of about 13% and a viscosity at a 10% concentration in water of about 30 centipoises at 25°C.

The epoxy-substituted polysecondary amine resin is applied to the gel film in an aqueous solution. In general, the pH of the coating solution may vary over a relatively wide range, e.g., from about 4 to about 10. A feature of the present invention, however, is that neutral or nearly neutral coating solutions, e.g., those having a pH in the range of from about 6 to 8, suitably may be employed using the self-curing, epoxy-substituted polysecondary amine primer resins with the result being that the special curing conditions and/or auxiliary catalytic characteristics of most other primer materials may be eliminated.

The epoxy-substituted resin is applied to the film at solution concentrations and in amounts which are sufficient to cause the adhesion of the topcoating to the regenerated cellulose film surface. Generally, the concentration of epoxy-substituted resin employed is at least about 0.5% and ranges up to about 5%. In the manufacture of sausage casings, the coating solution may, and preferably does, also contain small amounts, e.g., ranging up to about 10% by weight, of the casing plasticizing agent, e.g., glycerol, to preclude leaching of the plasticizer from the casing in the coated areas.

After the regenerated cellulose film, which includes sheet and tubular sausage casing, is coated with the epoxy substituted resin consisting of the reaction product of an epihalohydrin and a polysecondary amine of the types mentioned and is subsequently cured, it then is covered with a resin to provide desired qualities such as oxygen and moisture impermeability. The thickness of the resin coating is not especially critical but preferably of sufficient thickness to form a continuous film. This film may be from a fraction of a mil to several mils in thickness. After the resin coating is applied and dried, the regenerated cellulose sheet or sausage casing can be wound on reels or shirred (in the case of sausage casings).

The coating composition as described for forming the topcoat over the primer coat can comprise a variety of resinous materials including natural and synthetic resins and a liquid vehicle for carrying the resins. Inks such as oil base and flexographic ink are representative as inks usually contain a resin in a liquid vehicle. Resins as reported in the literature useful in making flexographic and oil base ink include vinyl or vinylidene halides, e.g., vinyl chloride, alkyd resins both of the long and short oil modified type, polyesters, coumarone-indene, polymeric esters of acrylic and methacrylic acid, polyamides, and cellulose derivatives such as nitrocellulose, cellulose acetate, phenol-aldehyde, e.g., phenol-formaldehyde, and others. The liquid vehicles useful in practicing the invention are the ones in which the resin can be dissolved or suspended therein. Generally, the liquid vehicle is a solvent and the resin is dispersed as a solution in the vehicle. In flexographic inks, for example, the liquid vehicle typically is an alcohol such as butanol, ethanol, or propanol, or a hydrocarbon typically of the aliphatic saturated type having from about 5–10 carbon atoms in the chain, e.g., heptane and hexane are employed. other liquid vehicles for making the coating composition include hydrocarbons of the aromatic series such as benzene, toluene, and xylene, alkyl ketones such as methyl isobutyl ketone, methyl ethyl ketone, acetone, and hydroxy ethers such as ethyl and butyl cellosolve are also included. Sometimes a mixture of the above liquid vehicles are combined where desired in order to produce better suspendability of the resin or lower drying temperature in making the desired coating composition.

Pigments or organic dyes can be included in the coating composition as with inks to provide the desired color for the coating composition to be applied over the primer coat. Examples of pigments include the inorganic pigments such as of the chrome yellows, mercury sulfide, zinc oxide, sulfoselenide, barium sulfate, barytes, calcium sulfate, calcium and magnesium carbonate, white lead, titanium dioxide, molybdenated chromium orange, iron blues, carbon blacks, and the like. Organic dyes which can be included in the coating composition are the aniline dyes, organic lakes, coal tar dyes, and so forth.

Generally, the coating composition is applied uniformly (as by dip-coating or spray-coating) to the surface of a primed regenerated cellulose film such as tubing or other food packaging film material. It then can be cured by heating in air or by other suitable methods until tack-free in order to effect the binding of the coating to the primed surface of the regenerated cellulose tubing without adversely affecting the excellent barrier properties of the coating. The coating thickness and coating ingredients are controlled so as to provide a final product having the desired properties, e.g., color, printability, or vapor barrier properties.

Other conventional additives to coating compositions such as inks can be added. These include plasticizers, surfactants, drying agents, hardeners, and so forth. These are well known in the art.

Having generally described the invention, the following examples are included for purposes of illustration so that the invention may be more readily understood and are in no way intended to limit the scope of the invention unless otherwise specifically indicated. All percentages are on a weight basis unless otherwise specified.

EXAMPLE 1

A regenerated cellulose film sheet is continuously prepared by passing viscose through an extrusion slit into a coagulating and regenerating bath. The film is washed and subsequently plasticized with glycerin following the coagulating and regenerating baths, and if there is any tendency to carry excess acid from the coagulating-regenerating baths, the casing may be passed through a 1% solution of sodium hydroxide as a premercerizing treatment.

After the gel film is plasticized, an undercoating or primer coating is applied to the gel cellulose film prior to drying. A satisfactory primer coating solution consists of 0.5% (by weight) Kymene 557 and 10% glycerol in an aqueous solution adjusted to a pH of about 7.5 with ammonium hydroxide. Kymene 557 (also known as Hercules Resin 2000) is a trademark of Hercules Powder Company, Wilmington, Delaware, for a water-soluble, polymeric polyepoxide which is the reaction product of epichlorohydrin and a polyamide prepared by reacting adipic acid with diethylene triamine. Kymene 557 is obtained as a pale amber liquid of 10% solids content, having a density of 1.026, a viscosity of 30 centipoises at 25°C. (Brookfield) a pH of 5.0, and nitrogen content (Kjeldahl) of 12.8% (dry solids basis) an epoxide content of about 450–500. The above coating composition is applied to the film by passing the regenerated cellulose film over a roller coater and leveled with a doctor blade forming a thin layer thereover. The coating then is dried and the resin cured.

A second coating composition comprising an oil base ink is used as a top coat for the Kymene coated cellulose film. An oil base ink which is representative of those which can be used for the coating composition comprises 47 pounds of lithographic varnish which is linseed oil bodied by heat, 4 pounds of a paste dryer comprising powdered sugar of lead and manganese linoleate dispersed in a lithographic varnish, 22 pounds of titanium dioxide, and 23 pounds of barium lake.

The top coat of oil base ink is applied by a roller coater to the Kymene coated surface of the regenerated cellulose film and heated in hot air to affect drying of the ink and adhesion to the Kymene modified primer coat. Excellent adhesion of the ink is obtained.

EXAMPLE 2

In this example, a Kymene primer coating is used to give improved adhesion of a top coat of an oil base ink. This coating provides an improved printed regenerated cellulose casing.

Clear, unreinforced regenerated cellulose casing is prepared in a conventional manner and coated with a primer coating of a composition essentially identical to that in Example 1 except that the Kymene content is increased from 0.5%–2%.

Cellulosic sausage casings are prepared by extruding viscose through a die having an annular orifice into a regenerating and coagulating bath. The casing may be manufactured at speeds ranging from 14–45 feet per minute. The viscose is extruded into a coagulating and regenerating bath containing ammonium sulfate, sodium sulfate, and sulfuric acid. In most cases, the coagulating and regenerating baths are separated having a higher proportion of the regenerating bath acid. The casing is washed to remove acids, salts, and other by-products and may be passed through a dilute caustic premercerizer bath to neutralize any acid carryover from the last wash.

A primer coating solution similar to that of Example 1 but having a Kymene content of 2%, is applied to the outer surface of the clear regenerated cellulose casing as a thin layer and the coated casing dried to cure the resin substantially as in Example 1.

An ink of an oil base type such as one containing 40 pounds lithographic varnish, 20 pounds carbon black, 6 pounds cobalt napthanate dryer dispersed in a lithographic varnish, 9 pounds boiled linseed oil, 10 pounds milori blue ink, 12 pounds of alkali reflex blue ink, and 3 pounds Japan dryer which is a linoleate of lead is cast over the coated portion of the cellulose casing as a thin film. The casing then is heated in order to dry the ink and cause it to adhere to the coated surface.

The resulting top coat of ink over the Kymene primer coat and has excellent adhesion thereto.

EXAMPLE 3

A fibrous cellulose casing is continuously prepared by passing fibrous paper (long fiber hemp paper), formed into a tube where it is impregnated and coated with viscose, at a rate of about 40 feet/minute into a coagulating and regenerating bath. After coagulation and regeneration, the regenerated cellulose coated casing is fed through various wash baths. The casing then is subsequently plasticized with glycerin following the coagulating and regenerating baths and if there is any tendency to carry excess acid from the coagulating-regenerating baths, the casing may be passed through a 1% solution of sodium hydroxide as a premercerizing treatment.

The fibrous casing, in the gel state, then is coated with the Kymene primer coating solution of Example 1. After coating with a thin layer of the coating composition, the casing then is passed through a dryer to cure the kymene coating.

An over coat composition of a flexographic ink which typically contains from about 20–40% of an inorganic pigment, from about 30–35% of a resinous material, from about 2–4% of a slip additive, and the balance of a solvent. In this case, the flexographic ink contains about 35% titanium dioxide pigment, about 35% of a polymethacrylic acid resin, 3% carnauba wax, and the balance of ethyl cellosolve. The coating is applied to the primer coated fibrous casing and subsequently heated to remove the liquid vehicle from the ink. A fibrous casing having a primer coat and adherent over coat such as a flexographic ink is obtained. The over coat has excellent adherence to the primer coat.

EXAMPLE 4

A casing made from regenerated cellulose having a primer coat is prepared in the same manner as in Example 2. The top coat which is applied over the primer coated regenerated cellulose casing is a resinous coating mixture such as a flexographic ink containing about 40% titanium dioxide pigment 35% of a conventional polyamide resin for flexographic ink, 3% carnauba wax, and the balance being butyl cellosolve. The resulting top coat is firmly adhered to the primer coat for providing a desirable casing.

EXAMPLE 5

A film sheet of regenerated cellulose is made and coated with a primer Kymene coat in accordance with the procedures of Example 1. The coated sheet then is dried and the resin cured. Next, a topcoat coating composition which is the flexographic ink of Example 3 containing a polymethacrylic acid resin is applied to the Kymene coated surface of the film sheet by means of a roller and then the coated sheet is heated to evaporate the liquid carrier. The overcoat of polymethacrylic acid is firmly bonded to the Kymene coat.

I claim:

1. A process for manufacturing resin-coated regenerated cellulose film, which comprises:
   coating one surface of a gel cellulose film prior to drying with a first coating composition of an aqueous solution of a water-soluble epoxy thermosetting resin reaction product of an epihalohydrin and a polysecondary amine selected from the group consisting of polyamideamines and polyureaamines, said epoxy resin having an epoxy equivalent weight of at least about 100, drying the coated gel film to cure said coating and provide on the ultimately produced dried regenerated cellulose film a water-insoluble, crosslinked, surface coating,
   applying over the crosslinked surface coating thus formed a thin coating of a second coating composition comprising a resin and liquid vehicle, and
   heating the coated casing to dry and cure the second coating thereon to form an adherent film.

2. The process in accordance with claim 1 in which said polysecondary amine is a polyamide amine formed by condensing a polyalkylene polyamine and a dicarboxylic aliphatic acid.

3. The process of claim 2 wherein said polyamide amine is the reaction product of adipic acid with diethylene triamine.

4. A film made from regenerated cellulose having a primer coat consisting of a coating comprising an insoluble, heat-cured reaction product of a water-soluble, thermosetting reaction product of an epihalohydrin and a polysecondary amine selected from the group consisting of polyamide amines and polyureaamines said reaction product having an epoxy equivalent of at least about 100, and an overcoat over said insoluble primer coat, said overcoat comprising an organic resin, said overcoat being tenaciously adherent to said primer coat.

5. The film of claim 4 wherein said polysecondary amine is a polyamideamine and is prepared by reacting a polyalkylene polyamine with a dicarboxylic aliphatic acid.

6. The film of claim 5 wherein said polyalkylene polyamine is diethylene triamine and said dicarboxylic aliphatic acid is adipic acid.

* * * * *